United States Patent
Braun et al.

(10) Patent No.: US 10,282,285 B2
(45) Date of Patent: May 7, 2019

(54) HUMAN INTERFACE MODULE FOR MOTOR DRIVE

(75) Inventors: Scott D Braun, Fredonia, WI (US); Wanda J Miller, Mequon, WI (US); Calvin C Steinweg, Hartford, WI (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 1387 days.

(21) Appl. No.: 12/241,695

(22) Filed: Sep. 30, 2008

(65) Prior Publication Data

US 2010/0079096 A1    Apr. 1, 2010

(51) Int. Cl.
    *G05B 19/042*    (2006.01)
    *G06F 12/02*     (2006.01)
    *G05B 19/409*    (2006.01)

(52) U.S. Cl.
    CPC ....... *G06F 12/0246* (2013.01); *G05B 19/042* (2013.01); *G05B 19/409* (2013.01); *G05B 2219/23409* (2013.01)

(58) Field of Classification Search
    CPC .......... A61M 1/127; A61M 2205/8212; A61M 2209/088; A61M 1/101; A61M 1/1029
    USPC ................. 702/182, 183, 184, 185; 701/115; 318/565
    See application file for complete search history.

(56) References Cited

U.S. PATENT DOCUMENTS

| | | | |
|---|---|---|---|
| 6,041,287 A * | 3/2000 | Dister et al. | 702/182 |
| 6,297,742 B1 * | 10/2001 | Canada | G01R 31/343 318/490 |
| 6,515,683 B1 | 2/2003 | Wright | |
| 6,984,950 B2 * | 1/2006 | Jonsson et al. | 318/440 |
| 7,006,914 B1 * | 2/2006 | Cahoon | B60R 25/04 701/115 |
| 7,092,771 B2 * | 8/2006 | Retlich et al. | 700/72 |
| 7,166,982 B2 * | 1/2007 | Takahashi et al. | 318/568.13 |
| 7,439,699 B1 | 10/2008 | Earnest | |
| 7,584,465 B1 * | 9/2009 | Koh | G06F 8/34 717/109 |
| 7,866,403 B1 * | 1/2011 | Borgstadt | 166/379 |
| 7,933,668 B2 * | 4/2011 | Braun et al. | 700/83 |
| 8,010,958 B2 | 8/2011 | Tanaka | |
| 8,226,374 B2 | 7/2012 | Peterson et al. | |
| 8,644,959 B2 | 2/2014 | Hermann | |

(Continued)

FOREIGN PATENT DOCUMENTS

| | | |
|---|---|---|
| DE | 9313750 U1 | 12/1993 |
| EP | 0443585 A2 | 8/1991 |

(Continued)

OTHER PUBLICATIONS

European search report dated Nov. 23, 2010.

(Continued)

*Primary Examiner* — Bickey Dhakal
*Assistant Examiner* — Zoheb Imtiaz
(74) *Attorney, Agent, or Firm* — Fletcher Yoder, P.C.

(57) ABSTRACT

A power electronics device with an improved human interface module (HIM) is provided. More specifically, a motor drive is provided that includes a HIM with a portable memory device that stores the programming configuration of the motor drive. The improved HIM with portable memory enables improved techniques for quickly and efficiently updating the programming configuration of one or several motor drives.

24 Claims, 6 Drawing Sheets

(56) References Cited

U.S. PATENT DOCUMENTS

| | | | |
|---|---|---|---|
| 2002/0135496 A1* | 9/2002 | Takehara | G01K 1/026 340/870.17 |
| 2002/0151993 A1* | 10/2002 | Olesen et al. | 700/86 |
| 2003/0041206 A1* | 2/2003 | Dickie | G06F 1/1616 710/303 |
| 2003/0216846 A1* | 11/2003 | Chang | G01C 21/26 701/36 |
| 2004/0158371 A1* | 8/2004 | Iggulden et al. | 701/29 |
| 2005/0075758 A1 | 4/2005 | Wakefield, II | |
| 2005/0189892 A1 | 9/2005 | Kokami et al. | |
| 2006/0001396 A1* | 1/2006 | Shimozono | H02K 11/00 318/800 |
| 2006/0026672 A1* | 2/2006 | Braun | 726/9 |
| 2006/0074499 A1* | 4/2006 | Hamidpour | G05B 19/0426 700/19 |
| 2006/0129336 A1* | 6/2006 | Pretlove et al. | 702/45 |
| 2006/0208673 A1* | 9/2006 | Kling | G01P 1/122 318/66 |
| 2006/0236014 A1* | 10/2006 | Yin | G06F 1/1616 710/303 |
| 2007/0043667 A1* | 2/2007 | Qawami | G06F 21/10 705/50 |
| 2007/0078555 A1* | 4/2007 | Dorgelo et al. | 700/108 |
| 2007/0090922 A1* | 4/2007 | Weingarth | G05B 19/0425 340/5.74 |
| 2007/0093921 A1* | 4/2007 | Braun | G05B 19/4185 700/83 |
| 2007/0093926 A1* | 4/2007 | Braun et al. | 700/112 |
| 2007/0262847 A1* | 11/2007 | Grabinger | G08C 17/02 340/3.1 |
| 2007/0286740 A1* | 12/2007 | Dehlke et al. | 417/53 |
| 2008/0094015 A1* | 4/2008 | Royak | H02P 21/0025 318/432 |
| 2008/0200209 A1* | 8/2008 | Cahoon | 455/557 |
| 2009/0096405 A1* | 4/2009 | Flickinger et al. | 318/565 |
| 2009/0315494 A1 | 12/2009 | Jeung et al. | |
| 2009/0315496 A1* | 12/2009 | Jeung | H02P 31/00 318/558 |
| 2010/0071487 A1* | 3/2010 | Kampbell et al. | 73/865.8 |
| 2010/0079096 A1 | 4/2010 | Braun et al. | |
| 2010/0100198 A1 | 4/2010 | Herman | |
| 2010/0170241 A1* | 7/2010 | Asai | 60/484 |
| 2011/0108569 A1* | 5/2011 | Jones | A23G 9/22 222/1 |
| 2011/0139030 A1* | 6/2011 | Kim | 104/53 |
| 2011/0185837 A1* | 8/2011 | Alfayad et al. | 74/490.05 |
| 2013/0198442 A1* | 8/2013 | Braun et al. | 711/103 |

FOREIGN PATENT DOCUMENTS

| | | |
|---|---|---|
| EP | 1571511 A2 | 9/2005 |
| EP | 1926206 A1 | 5/2008 |
| EP | 2169488 A2 | 3/2010 |
| GB | 2399237 A | 9/2004 |
| WO | 2007006774 A1 | 1/2007 |

OTHER PUBLICATIONS

European Search Report dated Apr. 2, 2015.
Chinese Office Action for CN Application No. 201410093035.4 with English translation dated Jan. 3, 2017; 16 Pages.

* cited by examiner

HUMAN INTERFACE MODULE FOR MOTOR DRIVE

BACKGROUND

The invention relates generally to the field of electrical power converters and inverters. More particularly, the invention relates to an enhanced human interface module for motor drives.

Power inverters and converters typically employ power modules to create a desired output voltage waveform, which is used to power various devices, such as motors and other equipment. Power modules such as motor drives are generally manufactured to be suitable a wide range of applications. Therefore, a typical motor drive usually includes general-purpose hardware and software components that provide the motor drive with a high degree of versatility. Before putting the motor drive into service, the motor drive may be custom programmed with the desired operating characteristics. The programming of the motor drive may be accomplished by providing several operating parameters that are customized to obtain the performance desired for the specific application. In some cases, the motor drive may be programmed by the motor drive manufacturer, the user of the motor drive, an original equipment manufacturer (OEM), system integrator, or other service provider. During its lifetime, a typical motor drive may be re-programmed several times to adjust to emerging needs. Moreover, from time to time, a motor drive may need to be replaced, and programming on the outgoing drive transferred or re-entered into the new system.

It may be advantageous, therefore, to provide an improved system and method for updating a programming configuration of a motor drive.

BRIEF DESCRIPTION

The present invention relates generally to an enhanced human interface module (HIM) for a motor drive that provides improved techniques for updating the programming configurations or operational codes of a motor drive. Embodiments of the present invention include a HIM with a portable memory component that holds one or more programming configuration(s) or operational code(s) of a motor drive. Other embodiments include improved techniques for using the portable memory to quickly and efficiently update the programming configurations or operational codes of one or more motor drives.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
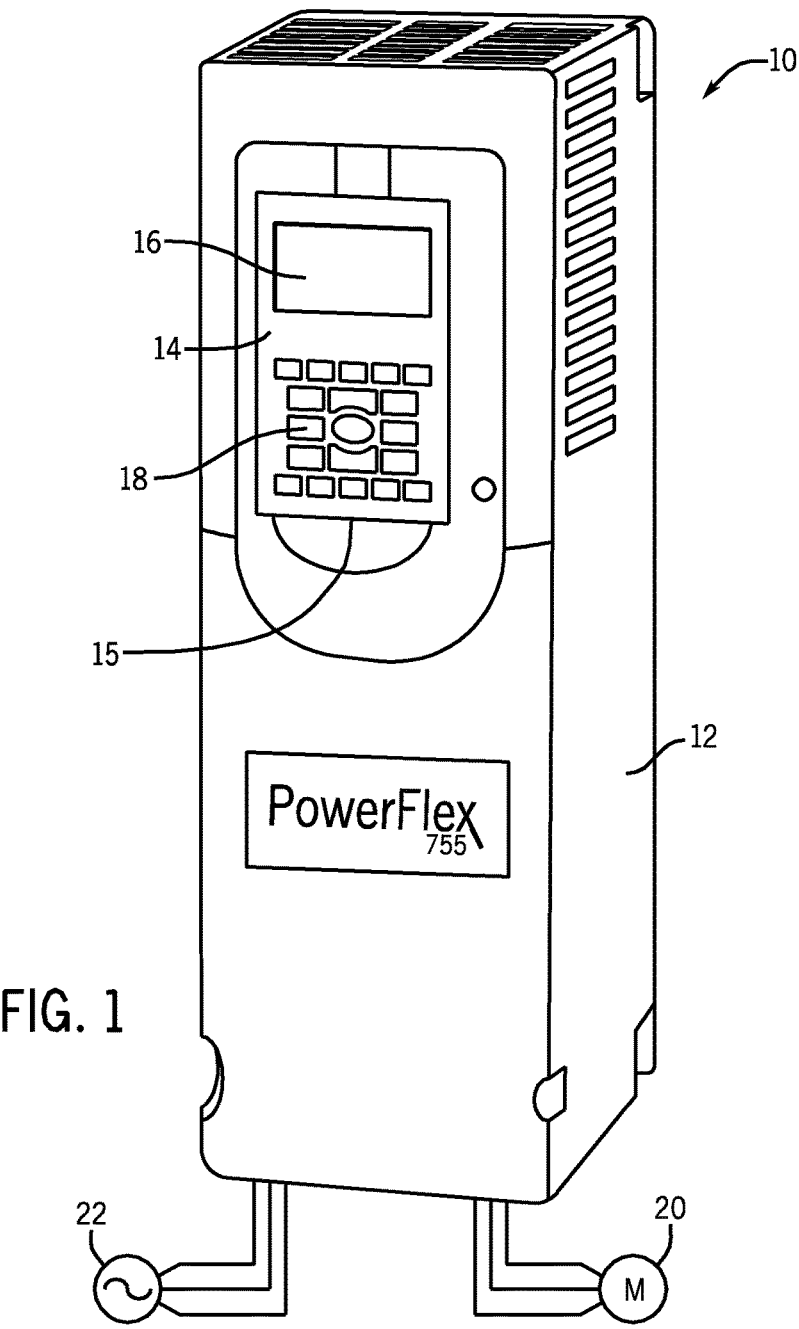
FIG. 1 is a perspective view of a motor drive in accordance with an embodiment of the present invention.

FIG. 1 is a perspective view of a motor drive 10 with an improved HIM 14, in accordance with embodiments of the present invention. In one embodiment, the motor drive 10 may be a PowerFlex drive manufactured by Rockwell Automation. The motor drive 10 may include a housing 12 having a receptacle 15 to hold a human interface module (HIM) 14.

To provide monitoring and/or control of the motor drive 10, the motor drive 10 may include a human interface module (HIM) 14. The HIM 14 may include a display 16, such as an LCD or other display device that may be used to provide feedback to the operator regarding the setting, performance or configuration of the motor drive 10. The HIM 14 may also include a keypad 18 allowing input by a user. The keypad 18 may be used to provide operator control of the motor drive 10, and may include various input structures, such as buttons, switches, touch pads, etc.

The HIM 14 may be attached to the motor drive 10 by placing it inside a receptacle 15 included in the housing 12 of the motor drive 10. In some embodiments, the receptacle 15 may include a communications port that mates with the HIM 14, and placing the HIM 14 into the receptacle 15 may enable electronic communications between the HIM 14 and the motor drive 10. Conversely, decoupling the HIM 14 from the motor drive 10 may cause communication between the motor drive 10 and the HIM 14 to be deactivated. In other embodiments, the motor drive 10 may also include a wireless communications device such as a Bluetooth® device, to enable communication between the motor drive 10 and the HIM 14 even if the HIM 14 is not physically connected to the motor drive 10.

As described further below, the motor drive 10 is adapted to receive three-phase power from a power supply 22 and to convert the fixed frequency input power to controlled frequency output power to be applied to a motor 20. The power supply 22 may include a generator or an external power grid. Within the motor drive 10 may be disposed a variety of components or devices used in the operation and control of a load. As will be described further below, the operating characteristics of the drive 10 may be determined, in part, by a programming configuration of the drive 10. The programming configuration of the drive 10 may include any data, software, or firmware that is used to define the performance of the drive 10, the appearance or performance of the user interface of the drive 10, or the performance or user interface appearance of any peripheral devices communicatively coupled to the drive. As will be described further below, the programming configuration may include operating parameters, parameter customization data, and firmware for the drive or any peripherals. Often, certain aspects of the programming configuration will be determined by a manufacturer, OEM, system integrator, or other service provider and transferred to the motor drive 10 from an external source. Furthermore, periodic updates of the programming configurations or operational codes may take place, such as when a drive 10 is replaced, the drive 10 application is altered, or firmware is updated. As will be described further below, the improved HIM 14 may enable improved methods of updating the programming configurations or operational codes of the motor drive 10.

Figure 2:
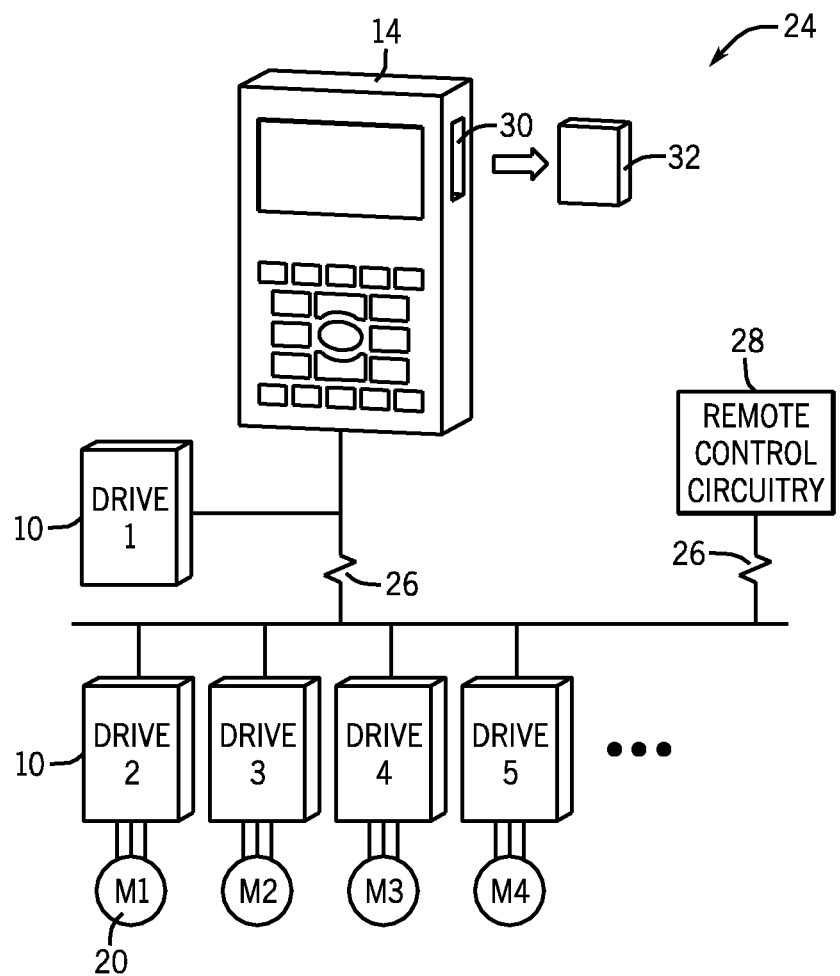
FIG. 2 is a perspective view of the improved HIM shown in FIG. 1, depicting a control network to which the HIM 14 may be coupled, in accordance with embodiments of the present invention.

FIG. 2 is a perspective view of the HIM 14 shown in FIG. 1, depicting a control network 24 to which the HIM 14 may be coupled, in accordance with embodiments of the present invention. As shown in FIG. 2, the HIM 14 may be used to monitor or control any number of drives 10. For example, the HIM 14 may be communicatively and physically coupled to a first drive 10, as shown in FIG. 1. In addition, the HIM 14 may also be communicatively coupled to any number of additional drives 10 through a network 26. In this way, an operator may use a single HIM 14 to monitor and/or control an entire control system. The HIM of one drive may also access and capture some or all of the configuration parameters of other drives on the network, further facilitating updating or replacement of such other drives, as described below. Furthermore, the HIM 14 and the drives 10 may also be coupled through the network 26 to a remote control circuitry 40. The remote control circuitry 40 may be used to monitor and/or control the control system 24 from a remote location.

The HIM 14 may also include a memory port 30 for receiving a portable memory 32. The portable memory 32 may include any suitable computer memory, such as a flash memory card or USB flash drive, for example. In some embodiments, the portable memory 32 may be a MicroSD™, SD, CompactFlash, or other commercial off-the-shelf flash card available from various sources, such as SanDisk of Milpitas, Calif. As will be explained further below, the portable memory 32 may include one or more programming configurations or operational code sets for one or more motor drives 10. Additionally, the portable memory 32 may also include sets of measurement data collected from the drives 10.

Figure 3:
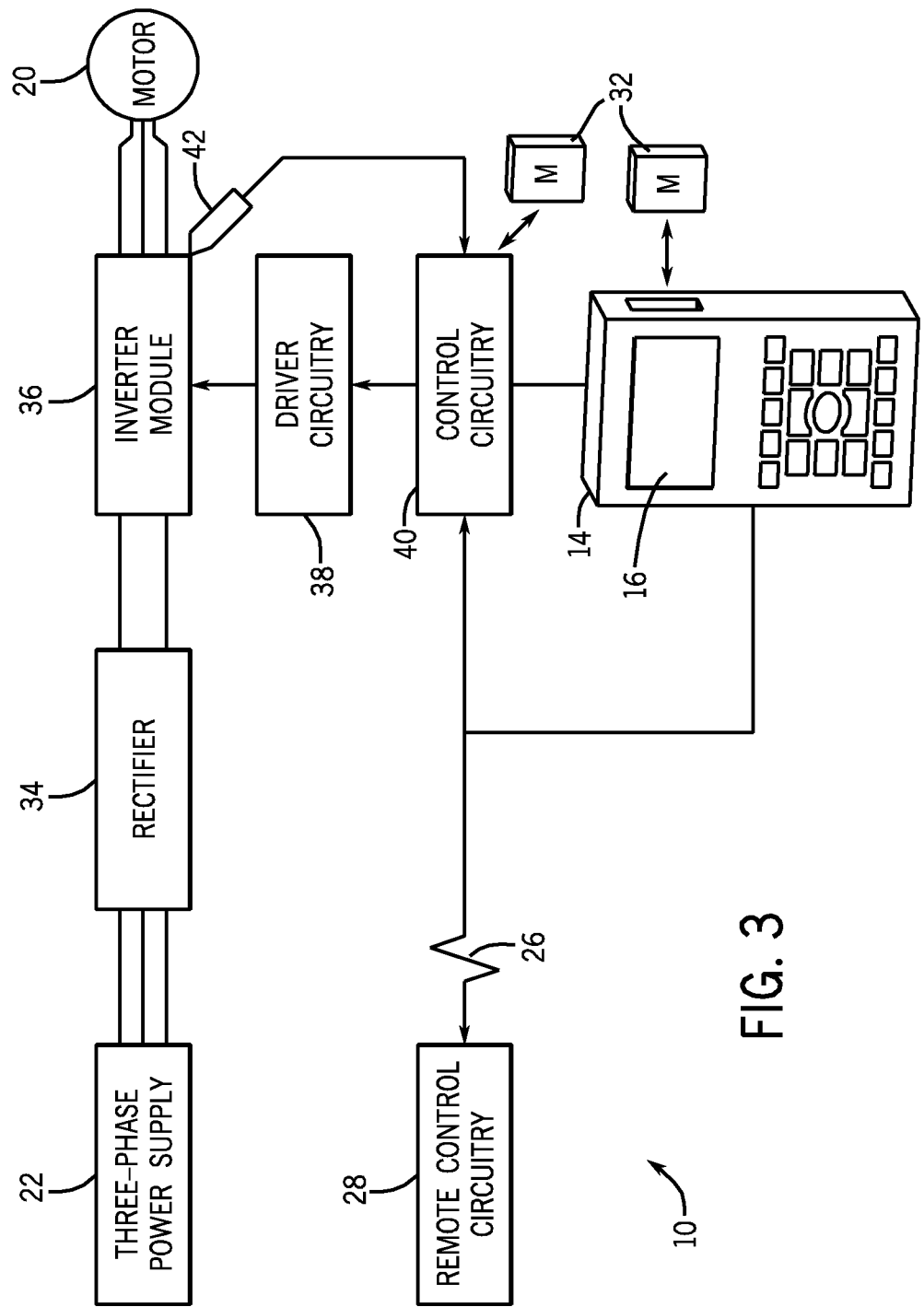
FIG. 3 is a block diagram of the motor drive of FIG. 1, in accordance with embodiments of the present invention.

FIG. 3 illustrates an exemplary motor drive 10 and provides additional details regarding the make-up of the motor drive 10. The motor drive 10 includes a rectifier 34 that receives a constant frequency three-phase voltage waveform from the power supply 22. Rectifier 34 performs full wave rectification of the three phase voltage waveform, outputting a direct current (DC) voltage to an inverter module 36.

Inverter module 36 accepts the positive and negative lines of DC voltage from the rectifier circuitry 34 and outputs a discretized three-phase waveform at a desired frequency, independent of the frequency of three-phase power supply 22. Driver circuitry 38 provides inverter module 36 with appropriate signals, enabling inverter module 36 to output the waveform. The resulting three-phase waveform may thereafter drive a load, such as a motor 20.

Control circuitry 40 may be coupled to the driver circuitry 38 and may be programmed to provide signals to the driver circuitry 38 for driving the motor 20. As discussed above, the control circuitry 40 may be programmed according to a specific drive configuration desired for a particular application. For example, the control circuitry 40 may be programmed to respond to external inputs, such as reference signals, alarms, command/status signals, etc. The external inputs may originate from one or more relays or other electronic devices. The programming of the control circuitry 40 may be accomplished through software configuration or firmware code that is loaded onto an internal memory of the control circuitry 40. The firmware of the control circuitry 40 may be configured to respond to a defined set of manipulable operating parameters. The settings of the various operating parameters determine the operating characteristics of the motor drive 10. For example, various operating parameters may determine the speed or torque of the motor 20 or may determine how the motor drive 10 responds to the various external inputs. As such, the operating parameters may be used to map I/O to control variables within the drive or to configure network or other drive options into the drive control variables. These variables include things like: speed presets, feedback types and values, computational gains and variables, algorithm adjustments, status and feedback variables, and PLC-like control programming.

In some embodiments, the motor drive 10 may include one or more sensors 42 for detecting operating temperatures, voltages, currents, etc. With feedback data from sensors 42, control circuitry 40 may keep detailed track of the various conditions under which inverter module 36 may be operating. The feedback data may be used to determine values for various feedback parameters, which may be displayed to the operator on the display 16 of the HIM 14. Additionally, the feedback data generated over time by the sensors 42 may be stored on the internal memory of the control circuitry 40, the HIM 14, or the portable memory 32.

The HIM 14 enables the operator to control the motor drive 10 by allowing the operator to manipulate the set of operating parameters programmed into the firmware of the control circuitry 40. The HIM 14 may also provide feedback to the operator, indicating motor drive 10 conditions such as actual motor speed, frequency, power, alarm conditions, etc. Accordingly, the display 16 may display the settings of some or all of the operating parameters of the drive 10. The appearance and functionality provided by the HIM 14 may be determined by software or firmware located in the HIM 14. The firmware of both the control circuitry 40 and the HIM 14 may be updated to incorporate new programming features or updates.

Additionally, the HIM 14 may be customized by the programmer to provide a more user friendly interface to the operator. In some embodiments, certain operating parameters may be customized by the programmer and displayed by the HIM 14 in terms that are more meaningful to the operator. For example, the motor drive 10 may be used in a production facility that manufactures items in a production line, and the speed of the motor may control the rate at which the items are produced. In that case, the HIM 14 may be programmed so that, rather than displaying a motor speed, the HIM 14 displays an item production rate corresponding with the motor speed. Accordingly, the programming configuration may include customized names associated with one or more operating parameters and displayed on the HIM 14 in place of the generic parameter name. Furthermore, the programmer may also limit the number of operating parameters that are accessible by the operator through the HIM 14. This parameter customization data may be included in the programming configuration of the drive.

In some cases, the programming configuration of the motor drive 10 may limit the functions available to the operator within certain suitable limits. In this way, the operator may control certain aspects of the motor drive 10, such as speed, without being allowed to change the basic timing requirements of the overall control system. Accordingly, some operating parameters may be accessible only to the programmer of the motor drive 10. Programmer accessible parameters may be manipulated by the programmer to customize the motor drive 10 for a particular control system application, while the operator accessible parameters allow the operator to control the everyday operation of the motor drive 10. In some embodiments, the firmware of the HIM 14 may be configured to allow the operator limited access to the full set of operating parameters programmed into the control circuitry 40. Through use of the HIM 14, the operator may manipulate the operating parameters of the motor drive 10 and change the functioning of the motor drive 10 accordingly, within the limits provided by the firmware on the HIM 14 or the control circuitry 40.

In some embodiments, the drive 10 may be communicatively coupled to one or more peripheral devices. For example, the drive 10 may be coupled to a communications module that allows communication with a network. The communications module may be programmed with certain firmware and may include various operating parameters, such as data rate, used to define the communication performance of the drive 10. The drive 10 may also include a feedback module that may include various encoders, resolvers, motion feedback sensors, etc. that may be used to provide feedback data to the drive 10. The drive 10 may also include digital or analogue input/output (I/O) peripherals, and enhanced safety board, for example. The peripheral devices may be included in an option card that is inserted into a communications port of the drive 10. All of the peripheral devices coupled to the drive 10 may be accessed through the HIM 14. As such, the HIM 14 may also obtain programming configuration, such as operating parameter information, and firmware, applicable to peripheral devices.

Setting or updating the programming configuration of the drive 10 may be accomplished using the portable memory 32 of the HIM 14. The portable memory 32 may include all or a portion of an entire motor drive 10 programming configuration, including the operating parameters applicable to the motor drive 10, firmware or firmware updates applicable to the HIM 14 or the control circuitry 40, and parameter customization data. The portable memory 32 may include programming configuration data for any peripheral devices that may be coupled to the drive. In some embodiments, the portable memory 32 may also be used to store historical trend data regarding the motor drive 10. For convenience, the present application describes the HIM 14 as including the portable memory 32. However, in some embodiments the control circuitry 40 may also include a memory port for receiving a portable memory 32 in addition to or instead of the HIM 14.

The control circuitry 40 may be configured to read the portable memory 32 to acquire the proper motor drive 10 configuration from the portable memory 32. An update of the drive programming configuration may include an update of some or all of the operating parameters of the motor drive 10, the firmware of the control circuitry 40, the firmware of the HIM 14, or some combination thereof. In some embodiments, the operator may initiate an update of the programming configuration of the drive 10 from the HIM 14. In other embodiments, the update may occur without operator input, in which case the motor drive 10 may be configured to automatically acquire the programming configuration each time the motor drive 10 is powered up.

Upon acquiring a motor drive 10 configuration from the portable memory 32, the motor drive configuration may be stored on the internal memory of the control circuitry 40. Thereafter, when the portable memory 32 is removed, the motor drive 10 will still retain the previously loaded programming configuration. Thus, if the portable memory 32 is not loaded into the HIM 14 or the control circuitry 40 is not communicatively coupled to the HIM 14, the control circuitry 40 may use the driver configuration already loaded in the internal memory of the control circuitry 40.

As will be discussed further, in relation to FIGS. 4-6, the use of the HIM 14 with the portable memory 32 enables a variety of methods for updating a configuration of the motor drive 10. For example, in one embodiment, a drive configuration may be generated on a workstation or by a remote service provider, and the drive configuration may then be downloaded onto the portable memory 32 and plugged into the motor drive 10. Furthermore, multiple drives may be updated with multiple drive configurations using a single HIM 14 or portable memory 32. Additionally, drive configurations may be transferred directly between drives. The techniques disclosed herein also provide additional advantages. For example, the techniques disclosed herein enable the automatic updating of the drive configuration upon initial powering-up of the drive. For another example, the present techniques also allow a motor drive 10 to be updated without using additional, specialized hardware to perform the updates.

Figure 4:
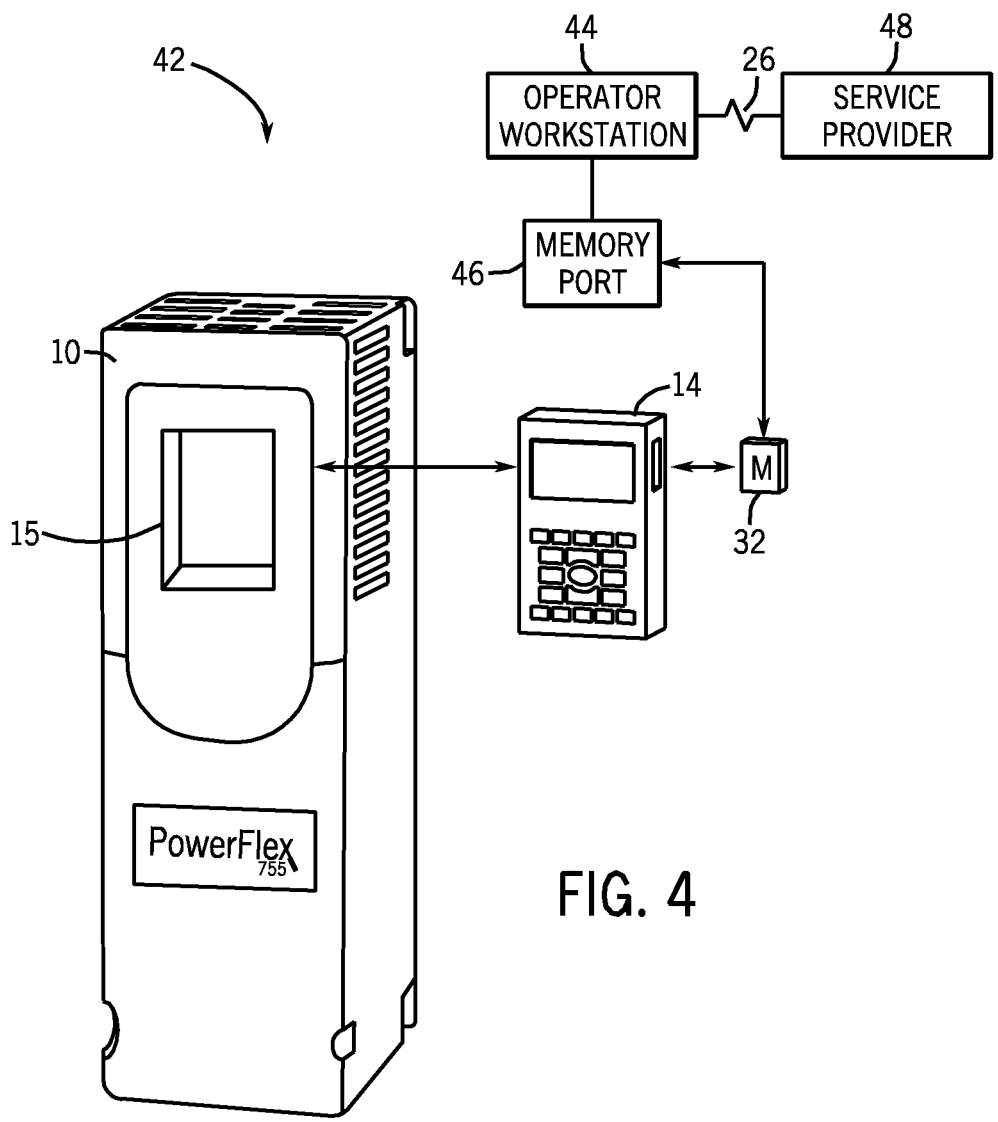
FIGS. 4-6 are flow diagrams illustrating methods of using the improved HIM 14 to update, transfer, or otherwise manage the configurations, the operational codes, or various user interface components of the motor drive, in accordance with embodiments of the present invention.
Figure 5:
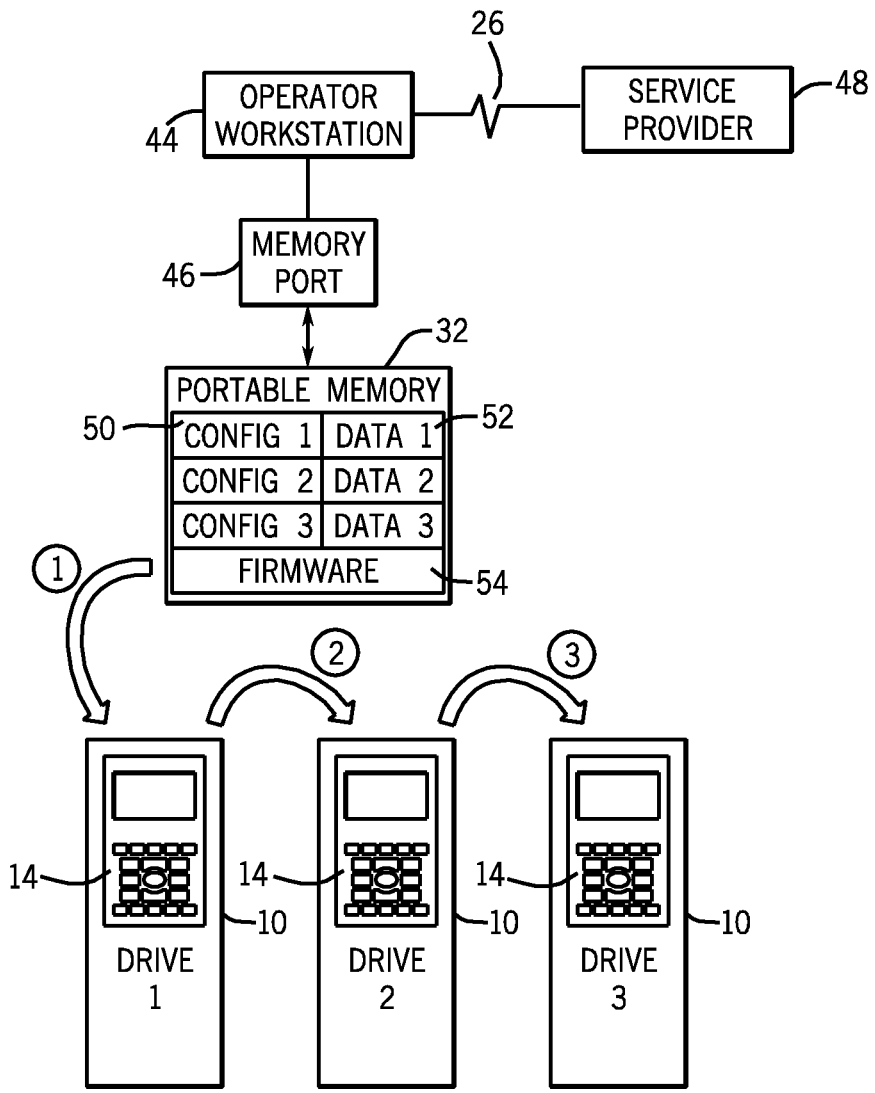
Figure 6:
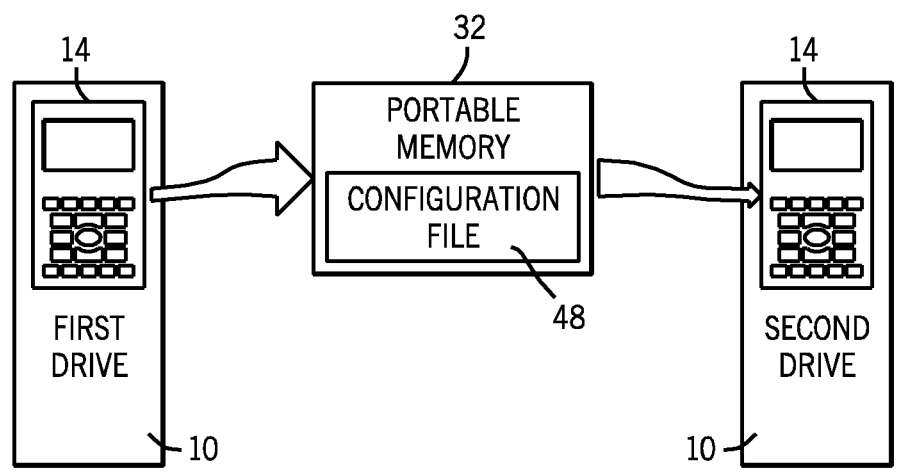

Turning now to FIGS. 4-6, several methods of using the improved HIM 14 to update the programming configuration of one or more motor drives 10 are depicted. Turning specifically to FIG. 4, a data transfer system 42 for updating a motor drive 10 is depicted. The data transfer system 42 may include a workstation 44, which may be any suitable computing device, including a personal computer or a mobile phone, for example. The workstation 44 may include or be coupled to a memory port 46 for receiving the portable memory 32 and enabling communication between the workstation 44 and the portable memory 32. In some embodiments, the workstation 44 may also be communicatively coupled to a network 26, which may include, for example, a Local Area Network (LAN) or Wide Area Network (WAN) and may allow connection to the Internet.

Several methods of generating or acquiring a motor drive configuration are enabled by the data transfer system 42. In one embodiment, the programming configuration of the motor drive 10 may be generated by the service provider 48 and transferred to the workstation 44 via the network 26. After receiving the programming configuration from the service provider 48, the operator of the workstation 44 may then use the workstation 44 to alter the programming configuration before loading the programming configuration onto the motor drive 10. For example, the workstation 44 operator may set the value of certain operating parameters used to customize the operating characteristics of the motor drive 10 for a particular usage. For another example, the workstation 44 operator may create parameter customization data used to define the appearance of the parameter data displayed to the operator. In another embodiment, the programming configuration may be generated at the workstation 44, without involvement from the service provider 48. In yet another embodiment, a programming configuration may be acquired from another drive 10 and uploaded to the workstation 44 through the memory port 46. In this way, a programming configuration for one drive 10 may be distributed to several motor drives 10.

After acquiring or generating the programming configuration, the user of the workstation 44 may then download the programming configuration to the portable memory 32 and insert the portable memory 32 into the HIM 14. After inserting the portable memory 32 into the HIM 14, the operator may communicatively couple the HIM 14 to the motor drive 10, such as by plugging the HIM 14 into the receptacle 15. At this time, the motor drive 10 has an updated programming configuration available and is ready to be placed into service. The next time the motor drive 10 is powered-up, the motor drive 10 may utilize the newly installed programming configuration.

In some embodiments, after the motor drive 10 is powered-up, the programming configuration may be loaded from the portable memory 32 into the memory of the control circuitry 40. Accordingly, powering-up the motor drive 10 may cause either the HIM 14 or the control circuitry 40 to compare the programming configuration of the control circuitry 40 and the programming configuration on portable memory 32. If a difference between the two is detected, the operator may be prompted by the HIM 14 to initiate the downloading and updating of the configuration file. In this way, the operator may preempt the programming configuration update and preserve the programming configuration already present on the control circuitry 40.

It should be noted that the programming configuration of the motor drive 10 may be set up to be updated with a new programming configuration when the portable memory 32 is loaded into HIM 14 and connected to the motor drive 10, regardless of whether the motor drive 10 is powered-up at the time the portable memory 32 is loaded into HIM 14. Because the motor drive 10 does not need to be powered up to add the HIM 14 containing the portable memory device 32, updating the motor drive 10 may be accomplished much more quickly and efficiently, and without the need of an available power source or specialized equipment at the origin of the update.

Turning to FIG. 5, a method of updating multiple motor drives 10 from a workstation 44 is shown. As discussed above, in relation to FIG. 4, the workstation 44 may be coupled to or include a memory port 46 for communicating with the portable memory 32 and may be coupled to a service provider 48 through the network 26. As shown in FIG. 5, the portable memory may include several data files applicable to several motor drives 10, such as, configuration files 50, log files 52, and the firmware file 54. The configuration files 50 may include parameter settings used by the control circuitry 40 for controlling the motor drive 10. The multiple configuration files 50 may include programming configurations for several drives 10 or alternate programming configurations for a single drive 10. The log files 52 may include parameter information corresponding with the operating conditions of a motor drive 10 measured over time, and may be useful in tracking, analyzing and troubleshooting the performance of a motor drive 10. The firmware file 54 may be a whole copy of a firmware program implemented in the control circuitry 40 or a partial update for a preexisting firmware program.

Using the portable memory 32 described above, several methods of updating a motor drive 10 or obtaining data from a motor drive 10 may be enabled. In the exemplary embodiment shown in FIG. 5, a portable memory 32 is used to update several motor drives 10 that have the improved HIM 14. According to the depicted embodiment, the portable memory 32 is inserted into a first motor drive 10, labeled "Drive 1." After the drive 10 is powered-up, the control circuitry 40 may obtain the configuration file 50 applicable to the specific drive. After the update is complete, the portable memory 32 may be removed from the HIM 14 of the first drive 10 without interrupting the operation of the first drive 10. The process may then be repeated for the remaining drives 10. Although three drives are depicted, the process maybe repeated for any number of drives 10. In this way, multiple drives 10 may be updated from one portable memory 32. Each of the drives 10 may be updated with the same configuration file 50 or each drive may be updated using a different configuration file 50. Additionally, rather than removing the portable memory 32 from the HIM 14 to perform the various updates, the entire HIM 14 may also be removed from the drive 10 and connected to each of the drives 10 to be updated. In this way, a single HIM 14 may be used to update several drives 10. The above process may also be used to update each drive 10 with the firmware file 54.

In addition to updating the drives 10, data may also be collected from the drives 10. After installing a HIM 14 with a portable memory 32 into a drive 10, the operator may store a log file 52 from the internal memory of the control circuitry 40 onto the portable memory 32. This storage of the log file 52 onto the portable memory 32 may be repeated for each drive 10. After collecting the log files 52, the operator may couple the portable memory 32 to the workstation through the memory port 46. From the workstation 44, the operator may analyze the log file 52 or may transmit the log file 52 to the service provider 48 for analysis. Additionally, in some embodiments, the HIM 14 itself may provide the capability of analyzing the log file 52.

Turning now to FIG. 6, an exemplary method of transferring a drive configuration from one motor drive 10 to a second motor drive 10 is shown. As depicted in FIG. 6, the portable memory 32 may be removed from a first motor drive 10 and installed in a second motor drive 10. As discussed above, the portable memory 44 may include a configuration file 50, which may store the entire drive configuration of the first motor drive 10, including the full set of operating parameters and/or the firmware loaded into the control circuitry 40. This process may enable an operator of the motor drive 10 to quickly and efficiently replace the first drive 10 with a second drive 10 while maintaining the identical programming configuration. Furthermore, the use of the portable memory 32 enables the replacement to occur without powering-up either of the drive 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system, comprising:
a rectifier that, in operation, rectifies input power and an inverter coupled to the rectifier via a DC bus and that, in operation, converts rectified power from the rectifier to a AC output power for driving an electric motor at desired speeds based upon a frequency of the output power;
control circuitry coupled to the inverter and that, in operation, controls switching of the inverter;
a housing in which the rectifier, the inverter, and the control circuitry are disposed; and
a human interface module removably physically coupled to an external receptacle of the housing and communicatively coupled to the control circuitry during operation of the motor drive system, the human interface module comprising memory that, in operation, stores programming for control of the electric motor by the control circuitry, the human interface module being removable from the external receptacle of the housing and physically replaceable on a similar external receptacle of a second housing of a second motor drive system to transfer the programming to the second motor drive system;
wherein the motor drive system is physically separate from a motor that is driven by the motor drive system.

2. The motor drive system of claim 1, wherein the human interface module is disposed on a front face of the housing.

3. The motor drive system of claim 1, wherein the human interface module comprises a display and a user interface that, in operation, allows a human operator to access data stored in the human interface module.

4. The motor drive system of claim 1, wherein the programming is loaded into the memory by transfer over a network.

5. The motor drive system of claim 4, wherein the memory comprises flash memory.

6. The motor drive system of claim 1, wherein the memory is removable from the human interface module without opening the housing.

7. The motor drive system of claim 1, wherein the receptacle comprises a communications port.

8. The motor drive system of claim 1, wherein the human interface module and the control circuitry communicate with one another wirelessly.

9. The motor drive system of claim 1, comprising internal memory that, in operation, cooperates with the control circuitry for controlling operation of the motor.

10. A motor drive system, comprising:
- a rectifier that, in operation, rectifies input power and an inverter coupled to the rectifier via a DC bus and that, in operation, converts rectified power from the rectifier to a AC output power for driving an electric motor at desired speeds based upon a frequency of the output power;
- control circuitry coupled to the inverter and that, in operation, controls switching of the inverter;
- a housing in which the rectifier, the inverter, and the control circuitry are disposed; and
- a storage device removably physically coupled to an external receptacle of the housing and communicatively coupled to the control circuitry during operation of the motor drive system, the storage device comprising memory that, in operation, stores programming for control of the electric motor by the control circuitry, the storage device being removable from the external receptacle of the housing of the motor drive system and physically replaceable on a similar external receptacle of a second housing of a second motor drive system to transfer the programming to the second motor drive system;
- wherein the motor drive system is physically separate from a motor that is driven by the motor drive system.

11. The motor drive system of claim 10, wherein the storage device comprises a human interface module removably coupled to the external receptacle of the housing.

12. The motor drive system of claim 10, wherein the storage device is disposed on a front face of the housing.

13. The motor drive system of claim 10, wherein the storage device comprises a display and a user interface that, in operation, allows a human operator to access data stored in the human interface module.

14. The motor drive system of claim 10, wherein the programming is loaded into the storage device by transfer over a network.

15. The motor drive system of claim 10, wherein the storage device comprises flash memory.

16. A motor drive system, comprising:
- a rectifier that, in operation, rectifies three-phase input power and an inverter coupled to the rectifier via a DC bus and that, in operation, converts rectified power from the rectifier to a three-phase controlled frequency AC output power for driving an electric motor at desired speeds based upon a frequency of the output power;
- control circuitry coupled to the inverter and that, in operation, controls switching of the inverter;
- a housing in which the rectifier, the inverter, and the control circuitry are disposed; and
- a human interface module removably physically coupled to an external receptacle of the housing and communicatively coupled to the control circuitry during operation of the motor drive system, the human interface module comprising memory that, in operation, stores programming for control of the electric motor by the control circuitry, the human interface module being removable from the external receptacle of the housing of the motor drive system and physically replaceable on a similar external receptacle of a second housing of a second motor drive system to transfer the programming to the second motor drive system during operation of the motor drive system and without interruption of operation of the motor drive system;
- wherein the motor drive system is physically separate from a motor that is driven by the motor drive system.

17. The motor drive system of claim 16, wherein the human interface module is disposed on a front face of the housing.

18. The motor drive system of claim 16, wherein the human interface module comprises a display and a user interface that, in operation, allows a human operator to access data stored in the human interface module.

19. The motor drive system of claim 16, wherein the programming is loaded into the memory by transfer over a network.

20. The motor drive system of claim 19, wherein the memory comprises flash memory.

21. The motor drive system of claim 16, wherein the memory is removable from the human interface module without opening the housing.

22. The motor drive system of claim 16, wherein the receptacle comprises a communications port.

23. The motor drive system of claim 16, wherein the human interface module and the control circuitry communicate with one another wirelessly.

24. The motor drive system of claim 16, comprising internal memory that, in operation, cooperates with the control circuitry for controlling operation of the motor.

* * * * *